S. M. KASS.
MOUSETRAP.
APPLICATION FILED JULY 31, 1919.
1,382,425. Patented June 21, 1921.
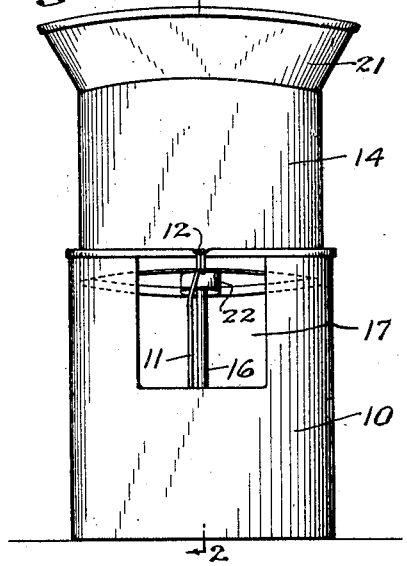
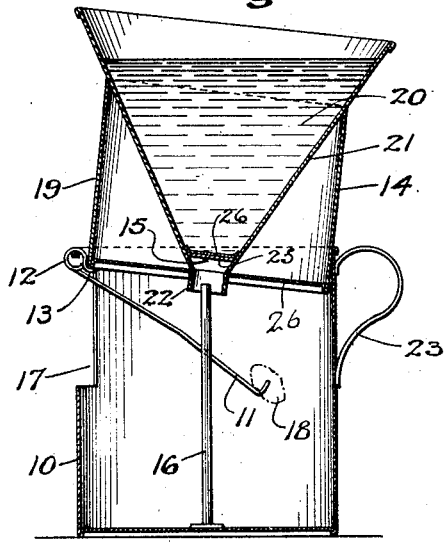
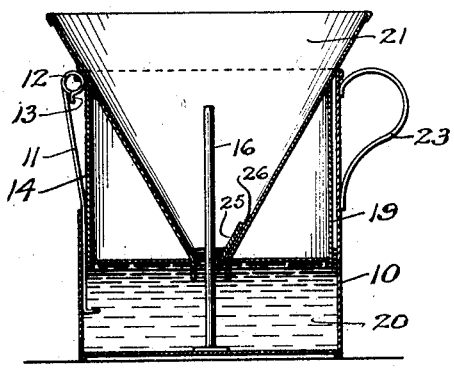
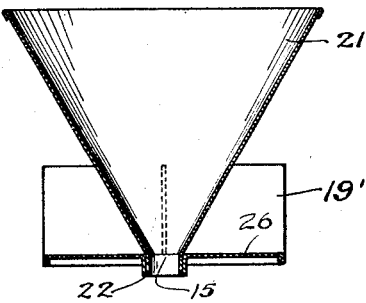
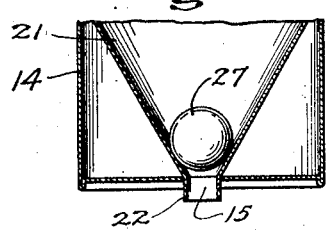
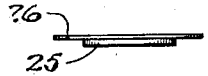
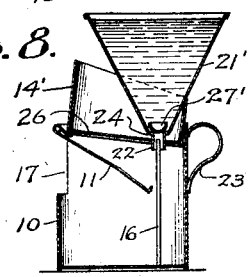
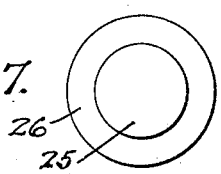
Inventor:—
Samuel M. Kass,
By:—
Attorney.

UNITED STATES PATENT OFFICE.

SAMUEL M. KASS, OF PHILADELPHIA, PENNSYLVANIA.

MOUSETRAP.

1,382,425.   Specification of Letters Patent.   Patented June 21, 1921.

Application filed July 31, 1919. Serial No. 314,543.

*To all whom it may concern:*

Be it known that I, SAMUEL M. KASS, a "citizen" of Russia, according to his best information, residing at 1828 Market street, Philadelphia, in the county of Philadelphia and State of Pennsylvania, have invented a certain new and useful Mousetrap, of which the following is a specification.

My invention relates to traps for mice and rats, here for convenience called mice, which are killed in the trap.

The purpose of my invention is to kill the mice without mutilation and provide for convenient disposal of the dead mice without requiring that they be handled.

A further purpose is to flood the mice with water when they are caught, for the purpose of killing them.

A further purpose is to use the weight of water provided for killing the mice as a means of causing quick and sure movement of comparatively light trap parts.

A further purpose is to support a water container so that it will be thrown by movement of the bait hook of a trap and by reason of its fall to discharge the water into the trap.

Further purposes will appear in the specification and in the claims.

I have preferred to illustrate one general form only, with slight modification, selecting therefor a form which has proved to be practical, efficient and thoroughly reliable and which at the same time well illustrates the principles of my invention.

Figures 1 and 2 are a front elevation and section thereof, respectively, upon line 2—2, of a form embodying my invention, shown in set position.

Fig. 3 is a section corresponding to Fig. 2 but after the trap has been sprung.

Fig. 4 is a corresponding section of one of the parts showing modified guide members.

Fig. 5 is a fragmentary section of one of the parts in which a ball valve is used.

Figs. 6 and 7 are a side elevation and top plan view upon enlarged scale of the valve seen in Figs. 2 and 3.

Fig. 8 is a section corresponding with Fig. 2 of a further slight modification, shown in set position. The scale here is reduced.

In the drawings similar numerals indicate like parts.

Describing the form shown:—My trap comprises a fixed supporting member 10 having a bait arm 11 pivoted at some such point as 12 to provide a catch 13; and a water holding movable member 14, valved as at 15 and adapted to rest upon the catch 13 and to have the valve opened as it falls by engagement with some projection 16 upon the fixed member.

An opening 17 is provided in the front of the trap so as to permit access by the mice to the bait 18.

For convenience in setting and guidance, the exterior surface of the movable member is given the same general contour as the fixed member. In Figs. 1 and 2 this is done by providing a nearly circular skirt 19 for the movable member and in Fig. 4, the same function is performed by using guiding flanges 19'.

So that the water 20 will flow out speedily and freely through a relatively small valve opening, the compartment 21 for the water is funnel-shaped and the lower end of the funnel is flanged at 22, in order that initially it may fit over the upper end of the projection 16, insuring that the parts as set are properly placed for subsequent engagement of the projection with the valve when the compartment falls. A handle 23 is shown for convenience in lifting the parts.

In the form shown in Figs. 1–4, the axis of the funnel is canted with respect to the perpendicular when the trap is set. As this may be considered to give an undesirable slope of the top of the funnel with respect to the water surface, I have shown in Fig. 8 a structure having the axis of the funnel 21' vertical in set position and always at an angle to the axis of the skirt 14'. In this latter form also, I have provided a slight nearly horizontal seat 24 for the valve inside the funnel slope.

The purpose of the variety in illustration is to indicate that changes may be made in the various parts freely just so a form of valve seat or valve is used in which the valve operates by weight and is opened by reason of movement of one of the parts. I have therefore shown the funnel and flanged seats described and several different kinds of valves.

In Figs. 2 and 3 the valve shown is of wafer type, comprising a body 25 of fairly stiff material, having sufficient weight for the purpose, permissibly paste-board, and a thin waterproofing sealing cover 26 which is pressed against the funnel edges by the weight of the water.

In Fig. 5 I show a ball 27 for the purpose.

In Fig. 8 I show a half 27' of a hollow ball serving the same sealing function.

In operation, the funnel is sufficiently filled with water and the trap is set as in Fig. 2. When the bait is moved the entire movable member falls to the position seen in Fig. 3, the valve is opened and the water pours into the fixed member and drowns the mouse, without mutilating it. Consequently, the movable member can be removed and the fixed receptacle emptied to dispose of the mouse.

It will be noted that a floor or bottom 26 is provided upon the movable member which cuts off the mouse from the inlet opening 17 and limits the space below this floor when the fluid holder has fallen to approximately the space which the fluid will fill so as to insure quick drowning of the mouse.

Having thus described my invention, what I claim as new and desire to secure by Letters Patent is:

1. A trap for mice, etc., comprising a fixed container, a movable fluid holder, a catch supporting the holder, a valve in the holder and means operative by reason of the fall of the holder for opening the valve when the catch is moved and the holder falls.

2. A trap for mice, etc., comprising a fixed container, a bait arm therefor, a movable fluid holder, a valve therein and means engaged by the valve with movement of the holder whereby the fluid in the holder is released into the container when the bait arm is moved.

3. A trap for mice, etc., comprising a fixed holder, a bait arm and catch thereon, a fluid holding movable member supported by the fixed container, a valve in the movable member and means engaged by the valve during the fall of the holder for opening the valve to release the fluid in the movable member into the container.

4. In a trap for mice, etc., a fixed container, a bait arm extending thereinto, a movable fluid holder supported by the container and having a bottom wall, a valve in said holder adapted when opening to release the water into the container and means for opening the valve when the holder falls, the fluid in the holder being approximately sufficient to fill the container up to the level of the said bottom wall.

5. In a trap for mice, etc., a container, a fluid holder supported thereon and adapted to fall, a valve in the holder and means in the container for releasing the holder and operating the valve.

6. In a trap for mice, etc., a container having an entrance for the mice, a fluid holder supported therein and movable down into the container to close the entrance, a catch retaining the holder in raised position, bait-operated means for releasing the catch, a valve in the bottom of the holder and a projection from the container adapted to engage the valve and open it when the holder falls into the container.

7. In a trap for mice, etc., a container, a fluid holder supported in the upper part of the container, a valve in the holder, a bait holder and means set in operation by movement of the bait holder for opening the valve to pour the water from the holder into the container.

8. The process of trapping and killing mice, which consists in supporting fluid over a container into which the mice are baited and dropping the holder for the fluid to close the entrance into the container and restrict the space therein, at the same time that the fluid is released to fill the restricted space of the container and drown the mice.

SAMUEL M. KASS.